US008028185B2

(12) United States Patent
Branover et al.

(10) Patent No.: US 8,028,185 B2
(45) Date of Patent: Sep. 27, 2011

(54) PROTOCOL FOR TRANSITIONING IN AND OUT OF ZERO-POWER STATE (75) Inventors: Alexander Branover, Brookline, MA (US); Rajen S. Ramchandani, Arlington, MA (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 869 days.

(21) Appl. No.: 12/045,764

(22) Filed: Mar. 11, 2008

(65) Prior Publication Data
US 2009/0235099 A1 Sep. 17, 2009

(51) Int. Cl.
G06F 1/00 (2006.01)
(52) U.S. Cl. .......................... 713/330; 710/262
(58) Field of Classification Search .......... 713/300–320, 713/323–330; 710/260, 262
See application file for complete search history.

(56) References Cited

U.S. PATENT DOCUMENTS

| 5,740,417 | A | 4/1998 | Kennedy et al. |
| 6,510,525 | B1 | 1/2003 | Nookala et al. |
| 6,553,501 | B1 | 4/2003 | Yokoe |
| 6,954,864 | B2 | 10/2005 | Schelling |
| 6,988,214 | B1 | 1/2006 | Verdun |
| 7,152,169 | B2 | 12/2006 | Cooper et al. |
| 7,159,766 | B2 | 1/2007 | Wurzburg et al. |
| 7,200,762 | B2 | 4/2007 | Pearl |
| 2009/0150696 | A1 | 6/2009 | Song et al. |
| 2009/0164814 | A1 | 6/2009 | Axford et al. |

OTHER PUBLICATIONS

"Advanced Configuration and Power Interface Specification"; Hewlett-Packard Corporation, Intel Corporation, Microsoft Corporation, Phoenix Technologies Ltd., Toshiba Corporation; Oct. 10, 2006; 631 pages.

*Primary Examiner* — Clifford Knoll
(74) *Attorney, Agent, or Firm* — Meyertons Hood Kivlin Kowert & Goetzel, P.C.; Jeffrey C. Hood (57) ABSTRACT

A processor may comprise one or more cores, where each respective core may comprise one or more state registers, and non-volatile memory configured to store microcode instructions executed by the respective processor core. The processor may further comprise a power management controller (PMC) interfacing with each respective core, and a state monitor (SM) interfacing with the PMC. The PMC may be configured to communicate with each respective core, such that microcode executed by the respective processor core may recognize when a request is made to transition the respective core to a low-power state. The microcode may communicate the request to the PMC, which may in turn determine if the request is for the respective core to transition to a zero-power state. If it is, the PMC may communicate with the SM to determine whether to transition the respective processor core to the zero-power state, and initiate transition to the zero-power state if a determination to transition to the zero-power state is made.

25 Claims, 4 Drawing Sheets

PROTOCOL FOR TRANSITIONING IN AND OUT OF ZERO-POWER STATE

BACKGROUND OF THE INVENTION

1. Field of the Invention

This invention relates generally to the field of computer design and, more particularly, to the design of a protocol for transitioning one or more sections of a processing unit in and out of a zero-power state.

2. Description of the Related Art

The ever increasing advances in silicon process technology and reduction of transistor geometry makes static power (leakage) a more significant contributor in the power budget of processors (CPUs). Currently known CPU ACPI (Advanced Configuration and Power Interface) and ACPI-based low-power states (C1-C5) are very instrumental in eliminating dynamic power consumption and reducing the CPU static power. The ACPI is an open industry standard originally developed by Hewlett-Packard, Intel, Microsoft, Phoenix, and Toshiba, and defines common interfaces for hardware recognition, motherboard and device configuration and power management. The most widely recognized element of ACPI is power management, offering improvements over past power management methods by giving the Operating System (OS) control of power management, in contrast with prior power management models where power management control was mainly under the control of the BIOS, with limited intervention from the OS. In ACPI, the BIOS provides the OS with methods for directly controlling the low-level details of the hardware, providing the OS with nearly complete control over the power savings.

Another important feature of ACPI is bringing power management features previously only available in portable computers to desktop computers and servers. For example, systems may be put into extremely low consumption states, i.e., states in which only memory, or not even memory, is powered, but from which "general-purpose events" (GPEs, similar to interrupts, which can be sent by devices such as the real-time clock, keyboard, modem, etc.) can quickly wake the system. ACPI uses its own ACPI Machine Language (or AML) for implementing power event handlers, rather than the native assembly language of the host system, and while the AML code is typically part of firmware (BIOS) it is interpreted by the OS.

The ACPI specifies various groups of states, among them global states, device states, performance states, and processor states. For example, the ACPI standard defines four processor power states, C0-C3. C0 is the operating state. C1 (often referred to as Halt state) is a state in which the processor is not executing instructions, but can (essentially) instantaneously return to an executing state. Some processors also support an Enhanced C1 state (CIE) for lower power consumption. C2 (often known as Stop-Clock state) is a state in which the processor maintains all software-visible states at the expense of possibly taking longer to wake up. C3 (often known as Sleep state) is a state in which the processor does not need to keep its cache coherent, but does maintain other states. Some processors have variations on the C3 state (Deep Sleep, Deeper Sleep, etc.) that differ in how long it takes the processor to wake up. While the ACPI specifies 4 states (C0-C3), processors can have independently defined hardware states that range from C0 to C5 and beyond, as previously mentioned. A processor generally supports each of those C-states, which are typically mapped to a particular ACPI C-state depending on the behavior of the processor while in that state, as defined by ACPI. However, none of these states completely eliminates the static power component consumed by the processor. Therefore the efficiency of C1-C5 states for power saving is becoming more limited for advanced CPU manufacturing process technologies and smaller transistor geometries.

Various methods have been proposed and implemented to lower power consumption as much as possible. For example, power consumption may be lowered by sizing-down, invalidating, and eventually turning-off the L2 cache by lowering the retention voltage to a level lower than is needed to retain L2 contents. This is also known as the C5-state. While this offers one possible solution in eliminating the massive L2 component from the static power consumption budget, it does not eliminate the power consumption contribution of smaller arrays (e.g. L1 cache) or regular logic, thus maintaining static power at fairly high level for advanced (45 nm and lower) processes.

A new state, the C6 state, first introduced by Intel in 2007, allows for complete elimination of both dynamic and static components of power consumption, by transitioning the CPU to the zero-state where 0V is applied to the CPU voltage plane, and the CPU clock is completely turned off. It should be noted that the C6-state is not equivalent to system sleep state S3 where most of the system is powered down, and restoration to the C0-state requires an extended period of time, oftentimes in the range of many seconds. The C6-state can be applied to a single-core processor or to any core or group of cores in multi-core processors, while keeping other cores and system components (chipset, I/O, DRAM) in fully functional state. At the moment the OS indicates the need for allocating some task/process on a given CPU that is presently in the C6-state, that given CPU is powered-up and becomes available for executing the requested task/process. Generally, the C6-state provides enablement for a more aggressive performance-oriented approach to CPU process technology (for example reducing the transistor effective length), which would otherwise be impeded by the inevitable increase in static power consumption. Effectively managing a processor's transitioning in and out of the C6-state can therefore lead to improved power management and result in reduced overall power consumption.

Other corresponding issues related to the prior art will become apparent to one skilled in the art after comparing such prior art with the present invention as described herein.

SUMMARY OF THE INVENTION

In one set of embodiments, a processor or processing unit (e.g. a Central Processing Unit, or CPU for short) may comprise one or more processor cores, each respective processor core itself comprising one or more state registers and a non-volatile memory, for example a non-volatile ROM (read only memory) configured to store microcode instructions that may be executed by the respective processor core. The processor may further comprise a first circuit or control circuit, e.g. a Northbridge (NB) controller coupled to each respective processor core to perform one or more functions in support of the processor core or processor cores. For example, if the first circuit is an NB controller, it may be configured to perform one or more functions typically associated with a North Bridge, e.g. DRAM control, and/or communications between the processor and AGP (Advanced Graphics Port), PCI Express, and/or the South Bridge. In addition, in one set of embodiments the NB controller may also include a power management controller, and a state monitor interfacing with the power management controller and a South Bridge, which may be part of the system in which the processor/processing unit is configured.

In one embodiment, the microcode executed by at least one respective core, or respective microcode executed by each respective core, is executable to communicate with the power management controller to recognize when a request is made to transition the respective processor core, or processor cores to a low-power state. In one set of embodiments the request may come from a command issued by an operating system (OS) running on the processor, or from a command issued by high-level software (SW) running on the processor. In other embodiments the request may come from elsewhere, depending on the given system configuration. Upon recognizing such a request from the command, the microcode may then trap the command, and request the NB controller to transition the respected core or cores to the low-power state. The term "trap" in this context may refer to an interrupt, typically caused by an exceptional condition (e.g., transitioning to a low power state). The trap may result in a designated part of the system (e.g. the operating system software, microcode executed by a processing unit, or other dedicated logic, circuit, or code), performing some action before returning control to the originating process.

The microcode may then spin (or enter a wait loop or state), waiting for an interrupt from the NB controller (e.g. from the power management controller within the NB controller). The NB controller may convert the low-power state request, which may be a C-state request (Cx, where x represents a number corresponding to a predefined C-state, e.g. C1-state), to a hardware (HW) C-state request, using a driver (or BIOS) configuration. For example, C1-C3 might be converted to a zero-power state, i.e. C6-state. In some embodiments a zero-power state may be defined as a zero-volt state. In other embodiments the zero-power state may be defined as another low-voltage state somewhat higher than 0V. Many different voltage levels corresponding to the zero-power state are possible and are contemplated.

If the NB controller has determined that the request is for the processor core or processor cores to transition to a zero-power state, it may then determine, based on a variety of factors monitored by the NB controller, whether to perform the transition to the zero-power state. If the NB controller has determined that the transition to the zero-power state is to take place, it may provide an indication of this, for example by updating a power action request register. The NB controller may then issue an interrupt signal, which may be a stop clock (STPCLK) signal, to alert the microcode, which may then check the now updated power action request register. Upon reading the contents of the power action request register and seeing the request for the transition to the zero-power state, the microcode may perform a series of required tasks prior to placing the processor core or processor cores in the zero-power state. Once the series of required tasks have been performed, the processor core or processor cores may then be ready for the zero-power state. In one set of embodiments these steps may include serializing the instruction stream, storing cache contents and the current architecture state of the processor core or processor cores, etc. Those skilled in the art will appreciate that the aforementioned tasks are exemplary, and fewer, different, and/or additional tasks may also preferably be performed, and that the intention is to ensure that no state information is lost, and once the processor core or processor cores are brought back from the zero-power state, they are able to resume proper operation and execution of the instruction stream. State information and/or cache data, as well as any other flush data may be stored either in on-die storage (storage on the same die as the processor), or in system memory. In general, such information may be stored in any storage medium from where the information may later be retrieved when bringing the processor core or processor cores back from the zero-power state.

Upon completing the required tasks, the microcode may set an acknowledge flag indicating that the sequence of required steps has been completed. In one set of embodiments, this may be performed by the microcode updating a power action acknowledge register, by setting a done bit, for example. The NB controller may read the power action acknowledge register, and upon recognizing that the sequence of required steps has been completed, it may send out a request or respective requests to gate off each operating clock corresponding to the processor core or processor cores transitioning to the zero-power state. Gating off in this case simply means that the processor core will not be receiving an operating clock signal while in the zero-power state. The NB controller may thereafter also send out a request or respective requests (to respective voltage regulators, for example) to lower the supply voltage of each processor core or processor cores transitioning to the zero-power state to a voltage level designated as the zero-power voltage level. In one set of embodiments, the designated the zero-power voltage level may be 0V, resulting in the processor core being completely powered down while residing in C6-state.

When a processor core is in C6-state (e.g. 0V supply voltage, operating clock uncoupled/gated off from the processor core) a section of the core or everything in that core may be powered off. In one set of embodiments, the microcode for a given processor code may be split into two parts, which may reside in two different locations: a non-volatile ROM and a volatile patch RAM. The portion residing in the non-volatile ROM may comprise the code essential for the processor core to start executing the code and to keep executing it. This portion may therefore still be present (i.e. not erased) though not active, while the processor core is in C6-state, while the portion residing in volatile patch RAM may need to be flushed along with other state information prior to entering C6-state (as described above). Consequently, the following events may take place when transitioning a processor core (or processor cores) from C6-state back to an operating state (e.g. C0-state).

The NB controller may identify an interrupt signal sent to the processor core (by an I/O subsystem, for example), and determine that the processor core needs to exit C6-state. The NB controller may subsequently send out respective requests to have the supply voltage and operating clock restored to the processor core in proper order, thereby making the processor core operational again. Proper order may mean insuring that circuit malfunction or glitches are avoided by preventing undefined signals to propagate in the processor core. For example, the power supply voltage may need to be restored before the operating clock is allowed to reach the core. The NB controller may then update the power action request register to indicate that the processor core needs to transition to an operating state from C6-state. The NB controller may subsequently assert an interrupt signal (e.g. a STARTCLK signal), which may initiate (and result in) activating the portion of the microcode that resides in the non-volatile ROM. The executing microcode may check the contents of the newly updated power action request register, and upon recognizing that the processor core needs to exit C6-state, it may begin initializing the processor core by restoring the architecture and system registers from the memory location(s) where they were stored (e.g. on-die or in system memory such as DRAM). The executing microcode may also initialize the processor caches (e.g. L1, L2, L3, etc), and may then read the portion of the microcode that has been flushed prior to entering C6-state back into the patch RAM. Upon completing this exit sequence, the executing microcode may update the power action acknowledge register to indicate that the execution of the sequence has completed, and may subsequently resume execution of the instruction stream.

Thus, transitioning one or more cores of a processor in and out of a zero-power state, e.g. C6-state, may be performed through a protocol established between a controller, e.g. a North Bridge controller configured in the processor, and microcode, or each respective microcode executing on the one or more cores. It should also be noted that while explicit mention has been made of processors and processor cores, alternate embodiments configured according to the principles of the present invention may equally be directed to microcontrollers and/or microcontroller cores, or other processing units (e.g. digital signal processing (DSP) units, graphics processing units (GPU), etc.), and those principles are not meant to be limited to processors and processor cores.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

A zero-power or zero-volt (0V) state, otherwise referred to as C6-state may allow for complete elimination of both dynamic and static components of power consumption, by transitioning a processor core (or multiple processor cores) to a state in which the respective supply voltage of the processor core may be reduced to 0V, and the operating clock used by the processor core may be uncoupled from the processor core, or gated off from the processor core, meaning simply that the clock signal may be prevented from reaching the processor core. Alternately, the operating clock used by the processor may be completely turned off, e.g. when no other system components depend on the same clock. C6-state is not equivalent to system sleep, e.g. state S3 where most of the system is powered down, and restoration to the operating state (C0-state) may require an extended period of time, oftentimes many seconds. C6-state may be applied to a single-core processor or to any core or group of cores in multi-core processors, while keeping other cores and system components (e.g. chipset, I/O, DRAM) in a fully functional state. Similarly, C6-state may be applied to single-core microcontrollers or to any core or group of cores in multi-core microcontrollers, while keeping other cores and system components in a fully functional state. In general, transitioning in and out of C6-state as set forth and disclosed herein is not meant to be limited to processors and microcontrollers, and may equally be applicable to other similar circuits and/or processing units configured in various systems, for example digital signal processing units, graphics processing units, etc.

When the Operating System (OS) or a high-level program indicates the need for allocating certain tasks/processes to execute on a processor core that is currently in C6-state, the processor core may be powered-up and may become available for executing the requested tasks/processes. Generally, the C6-state may provide enablement for a more aggressive performance-oriented approach to processor fabrication process technology—for example, reducing the effective transistor channel-length—which would otherwise be impeded by the inevitable increase in static power consumption. In one set of embodiments, a protocol between microcode executing on a processor core configured within a processor, and a first circuit (or control circuit or controller, such as a North Bridge controller for example), also configured within the processor may be used for transitioning the processor core to C6-state. In general, the protocol may be used for effectively transitioning any one or more processor cores in and out of C6-state. By performing transition to low power states, e.g. to C6-state, without requiring any control signals from outside the processor, for example from a South Bridge, a more efficient and less complicated transition to a low-power state, or zero-power state may be achieved. In effect, a single chip processor, that is, a processor implemented as an integrated circuit (IC) may conduct transition of one or more of its cores to a low-power state based on an interrupt signal generated by circuitry on the processor die itself.

In one set of embodiments, either OS or HW-based inference logic tracking a processor's (CPU's) idle state may request the core (or any one or more of all the cores) of the processor to transition into C6(0V) state. As used herein, C6-state refers to a zero-power state, which may itself refer to a zero-volt (0V) state. In certain embodiments, a zero-power state may be defined as a lowest-voltage state that is not exactly 0V, based on the particular requirements of any given system. Those skilled in the art will appreciate that zero-power state is not necessarily limited to 0V, and the protocol described herein may be used for transitioning to a zero-power state independently of the value of the actual voltage level associated with the zero-power level. In one set of embodiments, transitioning to C6-state may include the following steps:

(1) Storing (flushing) the updated contents of the processor caching system (e.g. L1, L2, L3, etc.) to the main (system) memory.

(2) Saving the architectural and system state in some powered-on storage.

(3) Turning down the processor clocking system.

(4) Reducing the supply voltage (powering the processor core) to 0V.

The architectural and system state may need to be saved in order to correctly and deterministically resume execution of the instruction stream when the processor core is transitioned back into the operational (C0) state. The architectural and system state may be saved either in external memory (e.g. system memory, DRAM) or in some on-die storage capacity that is not powered down in C6-state, and would therefore be configured outside of the processor core being placed in the C6-state. A processor core residing in C6-state may transition back to the operational state (C0) when one or more tasks need to be allocated to the processor core for execution. This may be requested via an interrupt signal or message. Transition from C6-state to C0-state may include the following steps:

(1) Restoring the supply voltage level of the processor core to operational level.

(2) Relocking the PLL.

(3) Resetting the processor core's internal state.

(4) Restoring the processor core's architectural and system state by reading the saved state from the external memory or on-die storage capacity where it was stored during transitioning to C6-state.

It should be noted that while one or more processor cores of a multi-core processor are in C6-state, other cores may remain in a fully operational state, executing tasks. If I/O devices send coherent probes while a processor core is in C6-state, the processor core's caching system may not need to be snooped, since its dirty (modified) contents would have been saved in main memory during the transition to C6-state.

Figure 1:
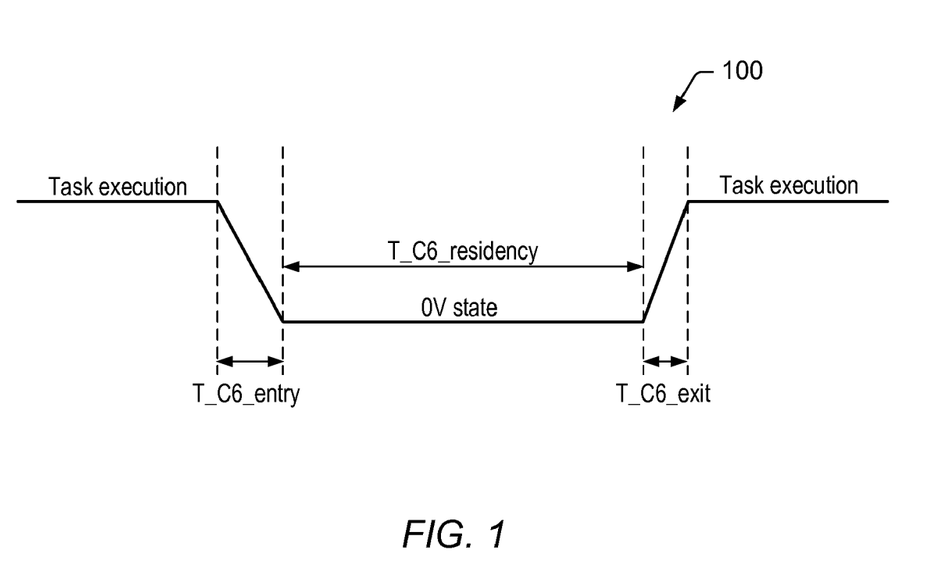
FIG. 1 shows a conceptual diagram of transitioning between an operating state and C6-state (0V-state), to illustrate C6-state residency trade-off between transition times and power.

One of the factors that may help achieve maximum power savings when placing a processor core (or multiple processor cores) is in C6-state is decreasing C6-state entry and exit times, while maximally lowering power consumption during those C6-state entry and exit times. Another key factor may be increasing C6-state residency. FIG. 1 provides a conceptual overview of the trade-off between transitioning into C6-state and C6-state residency. As shown in diagram 100, the overall time T (for C6-state entry, residency and exit) may be a sum of T_C6-entry+T_C6 residency+T_C6_exit. The overall power consumption P_C6 while in C6-state may then be calculated as $$P\_C6 = P\_entry*(T\_C6\_entry/T) + P\_exit*(T\_C6\_exit/T). \quad (1)$$

This implies that in order to keep P_C6 as close to 0 W as possible, the entry and exit times may need to be significantly lower than T_C6-residency. Another requirement may be to keep P_entry and P_exit lower than a specified threshold value. This may be implemented as a part of the C6-state entry/exit configuration, whereby the process of transitioning in and out of C6-state takes place in the operational state of the processor core characterized by the lowest power consumption. Additional requirements may include keeping the zero-power voltage configurable. As also previously indicated, the zero-power voltage may be defined higher than 0V (e.g. 0.2V~0.4V) trading off between low leakage and faster transition time (the higher the zero-power voltage, the shorter the transition time from operational state (C0) to C6-state.

Protocol between Microcode and NB Controller

Figure 2:
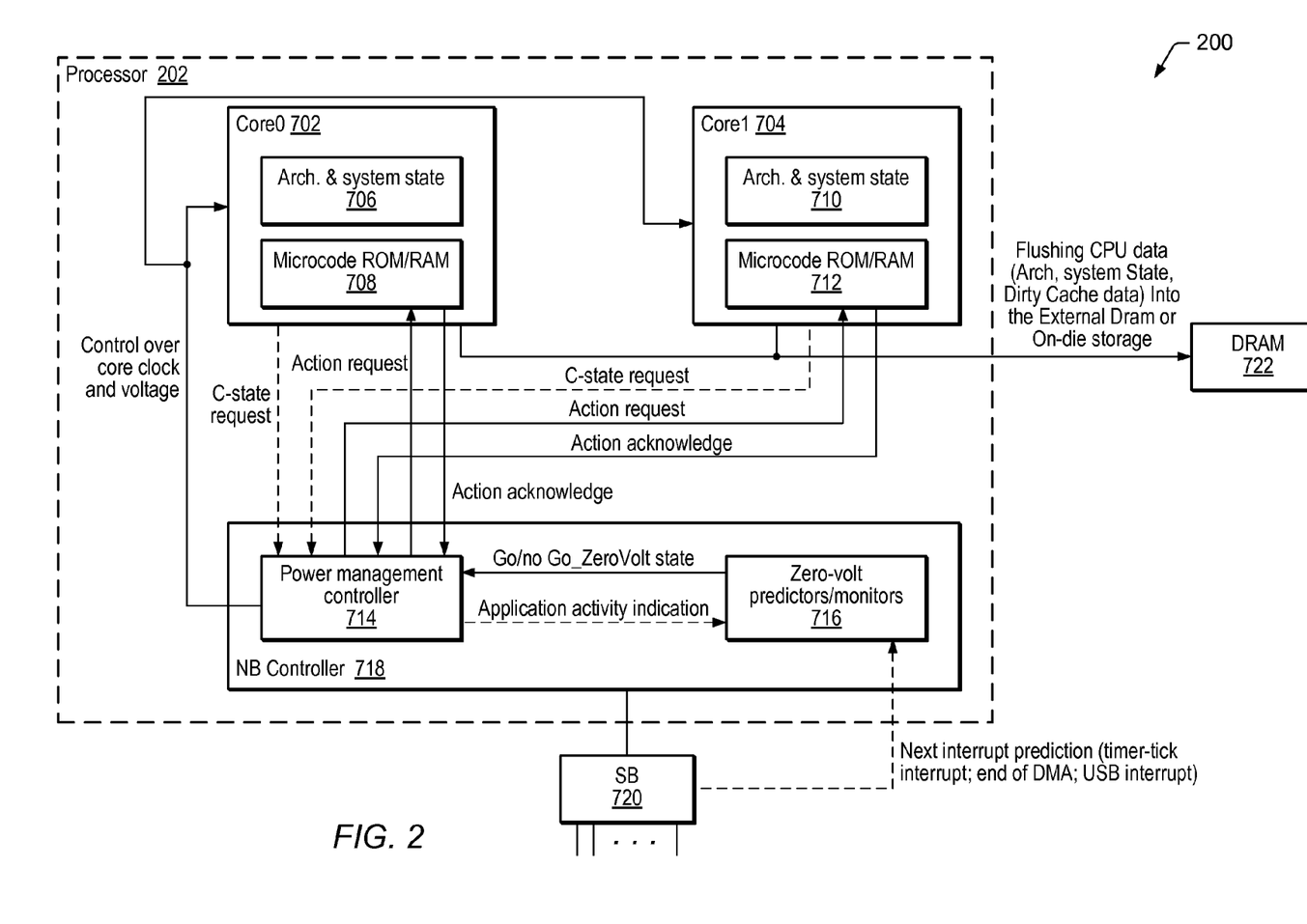
FIG. 2 is a partial logic block diagram of one embodiment of a computer system that includes a processor comprising one or more cores configured to transition between C-states.

FIG. 2 is a partial logic block diagram showing one embodiment of a computer system 200 that includes a processor 202 comprising one or more cores (702 and 704) configured to transition between power states, e.g. C-states using a protocol (which, in one set of embodiments, may be considered a "handshake" protocol) between a controller (718) configured on the processor, and microcode executing on the processor core (e.g., the processor core that is to transition to C6-state). Controller 718 may in general be a circuit (e.g. a "first circuit") configured on processor 202 to perform one or more functions in support of the one or more cores situated on the processor (cores 702 and 704 in the embodiment shown in FIG. 2). This circuit itself may comprise one or more circuits configured to perform one or more functions that may together comprise the full functionality of the circuit (which may also be referred to as a controller or control circuit). As shown in FIG. 2, this circuit is an NB controller (NBC) 718, which may include a circuit (or sub-circuit) configured to perform power management control as one of the functions of the overall functionality of NB controller 718. Furthermore, in yet other embodiments, the circuit (or controller or control circuit) represented in FIG. 2 by NB controller 718 may also be implemented as a distributed circuit, in which respective portions of the distributed circuit may be configured in one ore more of the processor cores, but operating on separate power planes, that is, using a different power supply than the section or sections of the cores functionally distinct from the portion or portions of the distributed circuit. The separate power planes, or distinct/separate power supplies may thereby enable each respective portion of the distributed circuit to perform its functions even when the rest of the processor core, e.g. the respective main section or sections (e.g. general processing section or sections) of the processor core that are functionally distinct from the respective portion of the distributed circuit, is in a zero-power state. This enables embodiments that feature a distributed circuit, distributed controller or distributed control circuit performing at least some or all of the functions performed by NB controller 718 shown in FIG. 2.

In the embodiment of FIG. 2, a circuit performing at least a portion of the overall functionality of NB controller 718 is shown as a power management controller (PMC) 714, which may be configured to communicate with each core (702 and 704). More specifically, PMC 714 may be configured to handle C-state requests received from core 702 and/or core 704, and interface with non-volatile memory elements, in this case ROMs, 708 and 712, respectively, to provide action requests and receive action acknowledgement to/from the microcode executing on core 702 and/or 704. Cores 702 and 704 may also comprise internal registers 706 and 710, respectively, or some other form of storage medium to hold architecture and system information. NB controller 718 may also interface with South Bridge (SB) 720, and system memory (in this embodiment, DRAM) 722. PMC 714 may also provide control over the supply voltage and operating clock of each core, and may communicate with predictors block 716 to determine whether transitioning to a requested C-state is to be performed. For example, if PMC 714 has determined that a requested C-state transition corresponds to a request to transition to a C6-state (zero-power HW state), PMC 714 may determine whether or not to perform the transition based on information received from predictors block 716.

Transitioning one or more of cores 702 and 704 to a zero-power state (C6-state) in system 200 will now be described according to FIG. 3, which shows a flow diagram of one embodiment of a protocol for transitioning one or more processor cores to C6-state. An operating system (OS) or high-level software program running on a processor, e.g. processor 202 of FIG. 2, may issue a command comprising a request for one or more cores, e.g. cores 702 and/or 704 of FIG. 2, to transition to a C-state, e.g. C-state x (Cx-state), where x may be a number designating a specific power state (502). The command may be recognizable by microcode executing on the processor core or processor cores, and the microcode may trap the command, and request a controller configured on the processor, e.g. NB controller 718 of FIG. 2, to transition to the given C-state (504). The microcode may then spin, awaiting a subsequent request from the controller (504).

The controller may subsequently determine to which hardware related C-state to transition. In one embodiment, the controller may convert the Cx-state request to a hardware C-state, using BIOS (or driver) configuration, for example, which may result in an indication for a transition to a zero-power (C6) state (506). The controller may determine based on certain predictors whether to transition to the requested C6-state, or to a demoted, lower C-state, i.e. a non-zero-power state (508). If the controller determines that transition to C6-state should not proceed (510), the controller may demote C6-state to a lower C-state (520). If the controller determines that transition to C6-state should proceed (510), the controller may update a register (which may be a power action register comprised within the controller) to specify in the register that a transition to C6-state is to take place, by updating the register to indicate the proper actions to be taken to facilitate and effect transition to C6-state (512). For example, the controller may update the register to indicate the next required action to be a FLUSH core to reach C6-state. After updating the register, the controller may assert an interrupt signal to indicate to the microcode that the microcode may proceed (512). In one set of embodiments, the controller may assert a STPCLK signal, which, according to prior art, is an ACPI defined Southbridge originated request for a processor or processor core to halt execution. As shown in 512, in system 200, for example, the STPCLK signal may be asserted by PMC 714 comprised in NBC 718.

The executing microcode may read the contents of the power action register, and upon recognizing the required operations that need to be performed, perform those operations, such as the FLUSH core operation, which may include flushing the processor core data (e.g. architecture and system state, cache data, etc.) into external system memory or on-die storage (514). Once the required operations (such as FLUSH core) have been performed, the microcode may update a second register (which may be a power acknowledge register configured within the controller) to indicate that the operations have been performed (514). For example, a "Done" bit may be set within the power acknowledge register. The controller may check the power acknowledge register, and upon recognizing that the required operations have been performed, may issue respective requests to gate off the operating clock of the transitioning core, and lower the transitioning core's supply voltage to the specified zero-power state level, which may be specified as 0V in some embodiments (516). Once the supply voltage has been lowered and the operating clock of the core has been uncoupled from the core, the core will reside in C6-state (518).

Figure 3:
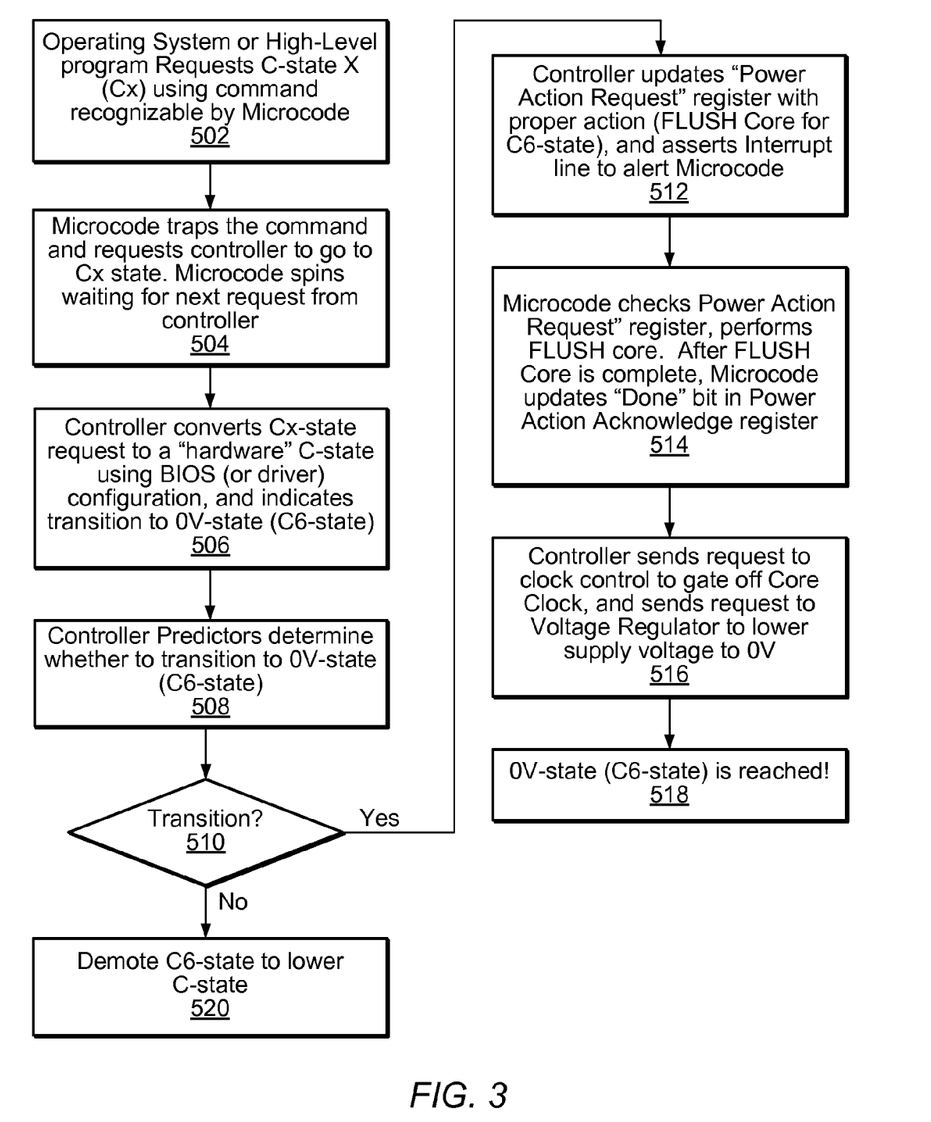
FIG. 3 is a flow diagram of one embodiment of a protocol for transitioning one or more processor cores to C6-state.
Figure 4:
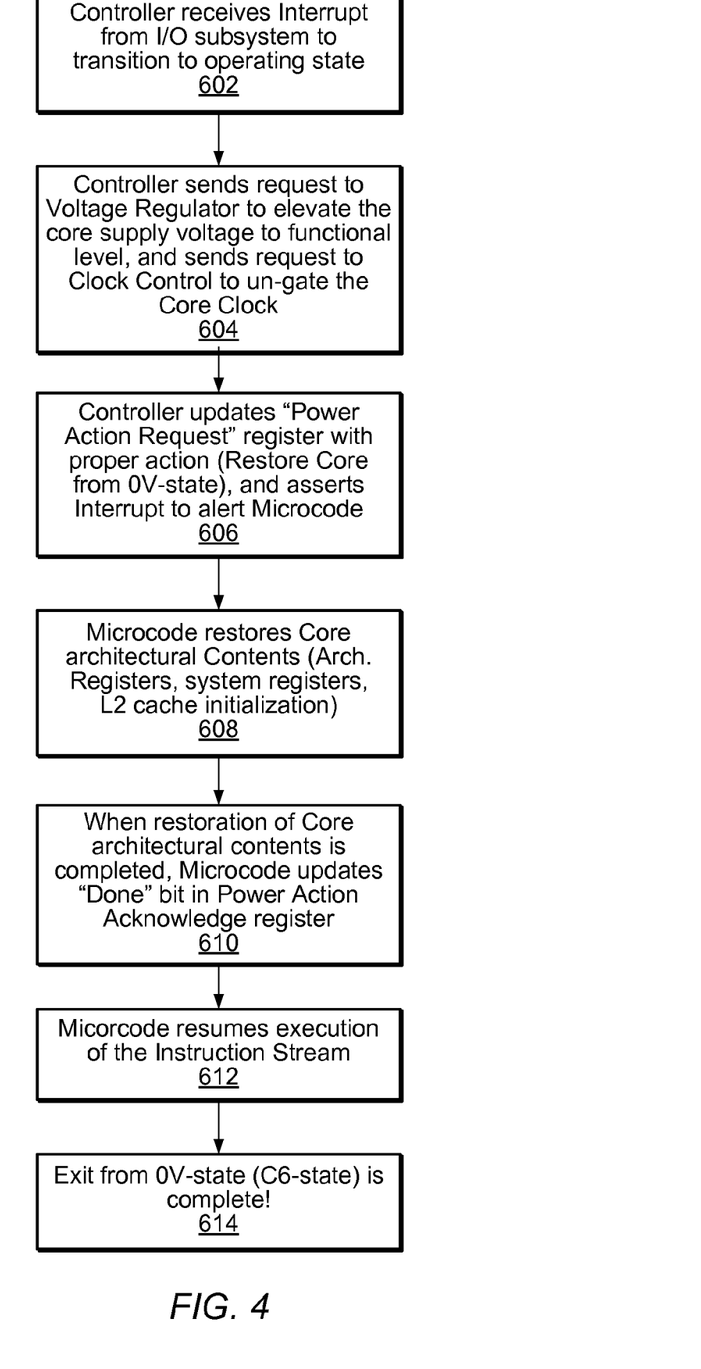
FIG. 4 is a flow diagram of one embodiment of a protocol for transitioning one or more processor cores to an operating state from C6-state.

FIG. 4 is a flow diagram of one embodiment of a protocol for transitioning one or more processor cores to an operating state from a zero-power state, e.g. from C6-state to C0-state. Similarly to the embodiment of the protocol illustrated by the flow diagram shown in FIG. 3, the protocol for transitioning from C6-state to C0-state may also apply, by way of example, to system 200 shown in FIG. 2. While the processor core (or cores) comprised in the processor is (are) in C6-state, the controller (which may be configured on the processor) may receive an interrupt signal, from an I/O subsystem, for example, to transition the processor core to an operating (e.g. C0) state (602). It should be noted that in some embodiments the interrupt signal may be received by a programmable interrupt controller (PIC) configured to handle the interrupt signal, and the PIC may be configured either inside the controller or outside the controller on the processor. Those skilled in the art will recognize that a variety of solutions for handling the interrupt signal on the processor are possible, and many of those solutions may be implemented to fit the protocol described herein. In response to the request, the controller (again, the controller may be a NB controller) may initiate re-activating the core, or cores, that were requested to transition back into an operating state. Accordingly, the controller may send out a request to a voltage regulator responsible for regulating the supply voltage of the core, to elevate the core supply voltage to a functional level (604). The controller may also send a request to a clock-control circuit responsible for providing an operating clock to the core, to un-gate, i.e. to re-couple the operating clock to the core (604). The controller may then update the power action request register to indicate what operations are to be performed for bringing the core back to an operational state, and may subsequently assert an interrupt signal to activate the microcode executable by the core (606). In one set of embodiments, the interrupt signal may be a STARTCLK signal, which may operate to activate a non-volatile storage element configured on the core to store at least an essential portion of the microcode needed by the core to start and continue executing the code.

The executing microcode may check the contents of the power action request register, and begin initializing the core by restoring the architectural and system contents, which may at this time be read back into the appropriate locations within the core from the storage media (external, system memory or on-die memory) where they had been stored as part of the transition into C6-state (608). This may also include initializing the processor cache system (e.g. L1, L2, L3 . . . ), and reading back (e.g. into patch RAM) any portion of the microcode that may have originally resided (e.g. in the patch RAM) outside the non-volatile storage element holding the essential portion of the microcode (608). Once the restoration of the architectural contents of the core has been completed, the microcode may update the power action acknowledge register to indicate that the core is now operational. For example, the microcode may set a "Done" bit inside power action acknowledge register (610). The microcode may then resume execution of the instruction stream on the core (612). Once execution of the instruction stream resumes, the core has completely exited C6-state into an operating (C0) state (614).

It should be noted that while FIG. 2 illustrates a single processor with two cores, the protocol—illustrated by respective embodiments in FIG. 3 and FIG. 4 for entering and exiting C6-state, respectively—may be equally applied to transition a single core or multiple cores (and more than two cores) to and from C6-state, and while some cores reside in C6-state, other cores may simultaneously remain fully functional. In addition, not each core is required to run the exact same microcode, and the controller may be configured to interact with the various different microcodes executed by the various cores. Those skilled in the art will appreciate the various different combinations and configurations in which the protocol may be applied to conduct transition to C6-state fully under the control of the controller (e.g. NB controller) that may be configured on the processor. Referencing FIG. 2, the power action request and power action acknowledge registers may be comprised in NB controller 718, in some embodiments specifically within PMC 714, or may reside in any portion of the processor, including the core, so long that they always remains powered on. In general, the various different combinations and configurations in which the protocol may be used to conduct transitioning in and out of a low-power state and/or zero-power state, e.g. C6-state, may be implemented under the control of a circuit (or "first circuit") configured on the processor to perform one or more functions in support of the one or more cores also configured on the processor. While the discussed embodiments focus on an NB controller, those skilled in the art will appreciate that alternate embodiments with a different circuit, control circuit, distributed circuit (as previously discussed) or controller (or multiple circuits) configured on the processor to execute the protocol are possible and are contemplated, and that all possible embodiments are not limited to those explicitly shown herein.

Benefits and Advantages

As previously mentioned, transitioning to C6-state provides many benefits over other low-power states (other C-state). One benefit is the improved power savings and battery life increase in mobile and server domains, due to the lowering of the static power component to 0 W. In the mobile domain, this may prove relevant for both thin & light and ultra-portable. C6-state also enables aggressive performance improvements in processor process technology and transistor geometry, which may otherwise have to be traded-off versus static power consumption. Accordingly, various embodiments of the protocol as detailed within the following claims may provide a flexible mechanism which may be controlled by the OS and/or HW, for placing one or several cores of a processor (e.g. CPU) in a power down state, or zero-power state, while keeping all other system parts, including other processor cores, chipset, I/O, and DRAM in a fully operational state. This provides a key benefit over system sleep states (e.g. S3-S5) in which all system components are powered down and execution is completely halted.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

We claim:

1. A method for placing at least a section of a processor in a zero-power state, the method comprising:
    recognizing and trapping a first instruction issued for transitioning a first core of one or more cores of the processor to a power-saving state;
    in response to said recognizing, notifying a first circuit of the processor that the first core is to transition to the power-saving state;
    the first circuit determining that the power-saving state is a zero-power state; and
    in response to said determining, placing the first core in the zero-power state.

2. The method of claim 1, wherein said placing the first core into the zero-power state comprises the first circuit asserting a signal that initiates a sequence of events that result in the first core transitioning to the zero-power state.

3. The method of claim 1, wherein said placing the first core in the zero-power state comprises the first circuit updating a first register to specify in the first register that the first core is to transition to the zero-power state.

4. The method of claim 3, wherein said placing the first core in the zero-power state further comprises:
    the first circuit asserting a first signal;
    in response to said asserting the first signal, checking contents of the first register;
    determining from the contents of the first register that the first core is to transition to the zero-power state; and
    performing one or more steps that result in the first core transitioning to the zero-power state.

5. The method of claim 4, wherein a first step of the one or more steps comprises enforcing retirement of the trapped first instruction.

6. The method of claim 4, wherein a last step of the one or more steps comprises setting a first flag, wherein said placing the first core in the zero-power state further comprises:
    in response to said setting the first flag, the first circuit sending out one or more of:
        a first request for uncoupling an operating clock of the first core from the first core; and
        a second request for reducing a supply voltage of the first core to a zero-power voltage level corresponding to the zero-power state.

7. The method of claim 6, wherein said placing the first core in the zero-power state further comprises one or more of:
    uncoupling the operating clock of the first core from the first core, in response to the first request; and
    reducing the supply voltage of the first core to the zero-power voltage level in response to the second request.

8. The method of claim 4, wherein the one or more steps comprise one or more of:
    serializing an instruction stream corresponding to the first core;
    storing updated contents of a cache system of the processor to system memory; and
    saving architectural and system state information in a powered-on storage.

9. The method of claim 1, further comprising transitioning the first core back to an operating state, in response to an interrupt signal or message indicating that one or more tasks are to be executed by the first core.

10. The method of claim 9, wherein said transitioning back to an operating state comprises:
    the first circuit sending a first request to have a supply voltage of the first core elevated to an operating-level voltage;
    the first circuit sending a second request to have an operating clock of the first core coupled to the first core;
    the first circuit updating a first register to specify in the first register that the first core is to transition back from the zero-power state;
    the first circuit asserting an interrupt signal to initiate a sequence of steps to transition the first core back from the zero-power state;
    restoring architectural contents of the first core in response to said asserting the interrupt signal;
    updating a second register to specify in the second register that said restoring has been performed; and
    resuming execution of an instruction stream corresponding to the one or more tasks to be executed by the first core.

11. The method of claim 1, wherein said placing the first core in the zero-power state comprises reducing a supply voltage of the first core to 0V.

12. The method of claim 1, wherein the first circuit is a distributed circuit having respective sections configured in one or more of the one or more processor cores, wherein each respective section of the first circuit is configured to operate according to a different power supply than power supplies that are powering remaining sections of the one or more of the one or more processor cores that are placed in the zero-power state.

13. A method comprising:
    recognizing and trapping a command that comprises a request to transition one or more sections of a processing unit to a power-saving state;
    in response to said recognizing the command, notifying a control circuit of the processing unit of the request;
    the control circuit of the processing unit determining, based on the request, that the power-saving state is a zero-power state;
    the control circuit of the processing unit asserting a first interrupt signal in response to said determining; and performing a sequence of steps that result in the one or more sections of the processing unit transitioning to the zero-power state in response to said asserting the first interrupt signal.

14. The method of claim 13, further comprising the control circuit of the processing unit updating a first register with information indicating that the one or more sections of the processing unit are to transition to the zero-power state.

15. The method of claim 14, wherein said performing the sequence of steps comprises checking the updated first register and determining from the updated first register that the one or more sections of the processing unit are to transition to the zero-power state.

16. The method of claim 13, wherein said performing the sequence of steps comprises enforcing retirement of the trapped command.

17. The method of claim 13, wherein said performing the sequence of steps comprises updating a second register with information indicating that the one or more sections of the processing unit are ready to be powered down.

18. The method of claim 17, wherein said performing the sequence of steps further comprises:
the control circuit of the processing unit checking the updated second register and determining from the updated second register that the one or more sections of the processing unit are ready to be powered down;
the control circuit of the processing unit issuing one or more of:
a first request to reduce respective supply voltages of the one or more sections of the processing unit to a zero-power voltage level; and
a second request to uncouple respective operating clocks of the one or more sections of the processing unit from the one or more sections of the processing unit.

19. The method of claim 18, wherein the zero-power voltage level is 0V.

20. A processor comprising:
a core operating according to a power supply voltage and a clock signal, and operable to execute a first microcode; and
a controller interfacing with the core;
wherein the first microcode is executable to recognize and trap a first command requesting a low-power state for the core, wherein the first microcode is further executable to request the controller to transition the core to the low-power state in response to having recognized the first command;
wherein in response to being requested to transition the core to the low-power state, the controller is operable to determine whether the low-power state is a zero-power state;
wherein the controller is operable to initiate a transition of the core to the zero-power state, in response to the control circuit having determined that the low-power state is the zero-power state;
wherein the first microcode is executable to complete one or more tasks required prior to placing the core in the zero-power state, in response to the controller having initiated the transition of the core to the zero-power state;
wherein the first microcode is executable to instruct the controller of the one or more tasks having been completed; and
wherein in response to being instructed of the one or more tasks having been completed, the controller is operable to issue respective requests to lower the power supply voltage to a zero-power voltage level and uncouple the clock signal from the core.

21. The processor of claim 20, further comprising:
a first memory element configured to store the first microcode;
a first register, wherein as part of initiating the transition of the core to the zero-power state, the controller is operable to update the first register with first information indicating that the core is to be placed in the zero-power state, wherein the first microcode is executable to check the updated first register and complete the one ore more tasks in response to the first information; and
a second register, wherein as part of instructing the controller of the one ore more tasks having been completed, the first microcode is executable to update the second register with second information indicating that the core is ready to be placed in the zero-power state, wherein the controller is operable to check the updated second register and issue the respective requests in response to the second information.

22. The processor of claim 20, further comprising:
one or more additional cores, each interfacing with the controller and operating according to a respective power supply voltage and a respective clock signal, and each operable to execute the first microcode or a respective microcode;
wherein at least one microcode of the first microcode and each respective microcode is executable to recognize and trap respective commands requesting the low-power state for one or more of the additional cores, wherein the at least one microcode is further executable to request the controller to transition the one or more of the additional cores to the low-power state in response to having recognized the respective commands;
wherein in response to being requested to transition the one or more of the additional cores to the low-power state, the controller is operable to determine whether the low-power state is a zero-power state;
wherein the controller is operable to initiate a transition of the one ore more of the additional cores to the zero-power state, in response to the control circuit having determined that the low-power state is the zero-power state;
wherein the at least one microcode is executable to complete one or more tasks required prior to placing each of the one or more of the additional cores in the zero-power state, in response to the controller having initiated the transition of the one or more of the additional cores to the zero-power state;
wherein the at least one microcode is executable to instruct the controller of the one or more tasks having been completed; and
wherein in response to being instructed of the one or more tasks having been completed, the controller is operable to issue respective requests to lower the respective power supply voltage of each of the one or more of the additional cores to a zero-power voltage level, and uncouple the respective clock signal of each of the one or more of the additional cores from the one or more of the additional cores.

23. A system operable to run an operating system (OS), the system comprising:
a processor configured to operate according to a power supply voltage and a clock; and
system memory interfacing with the processor;

wherein the processor is operable to recognize and trap a first instruction, issued by the OS or a program running under the OS, for transitioning at least one section of the processor to a low-power state;

wherein in response to recognizing the first instruction, the processor is operable to determine whether the low-power state is a zero-power state based on the first instruction, and assert an interrupt signal if the processor has determined that the low-power state is a zero-power state; and wherein in response to the processor having asserted the interrupt signal, the processor is operable to store processor data in the system memory or in processor memory external to the at least one section of the processor, wherein the processor data corresponds to a current state of the at least one section of the processor;

wherein in response to the processor having stored the processor data, the processor is operable to issue respective requests to lower the power supply voltage to a zero-power voltage level for the at least first section of the processor, and uncouple the clock from the at least first section of the processor.

24. The system of claim 23, wherein the at least a first section of the processor comprises one or more processor cores, and wherein the processor further comprises a control circuit configured to:

perform the determination of whether the low-power state is a zero-power state based on the first instruction;

assert the interrupt signal if the control circuit has determined that the low-power state is a zero-power state; and issue the respective requests to lower the power supply voltage to a zero-power voltage level and uncouple the clock from the one or more processor cores, in response to the processor having stored the processor data.

25. A processor comprising:

one or more processor cores, each respective processor core of the one or more processor cores comprising:
one or more state registers; and
non-volatile memory configured to store microcode instructions executed by the respective processor core;

a power management controller interfacing with the non-volatile memory of each respective processor core of the one or more processor cores; and a state monitor interfacing with the power management controller;

wherein the power management controller is configured to communicate with the non-volatile memory of each respective processor core of the one or more processor cores to recognize when a request is made to transition the respective processor core of the one or more processor cores to a low-power state; and wherein the power management controller is configured to communicate with the state monitor to determine whether to transition the respective processor core of the one or more processor cores to a zero-power state if the request to transition the respective processor core of the one or more processor cores to a low-power state is a request to transition the respective processor core of the one or more processor cores to a zero-power state.

* * * * *